(12) United States Patent
Hertling et al.

(10) Patent No.: US 10,112,714 B2
(45) Date of Patent: Oct. 30, 2018

(54) SIGNALING PRINT LOCATIONS

(71) Applicant: Hewlett-Packard Development Company, L.P., Houston, TX (US)

(72) Inventors: William E. Hertling, Portland, OR (US); Benjamin White, Vancouver, WA (US); Mike Whitmarsh, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 214 days.

(21) Appl. No.: 15/138,725

(22) Filed: Apr. 26, 2016

(65) Prior Publication Data

US 2017/0305549 A1    Oct. 26, 2017

(51) Int. Cl.
*B64D 1/18*      (2006.01)
*B64C 39/02*     (2006.01)
*G01S 3/781*     (2006.01)

(52) U.S. Cl.
CPC ............. *B64D 1/18* (2013.01); *B64C 39/024* (2013.01); *G01S 3/781* (2013.01); *B64C 2201/027* (2013.01); *B64C 2201/12* (2013.01); *B64C 2201/141* (2013.01)

(58) Field of Classification Search
CPC .................................. B64D 1/18; B64C 29/02
See application file for complete search history.

(56) References Cited

U.S. PATENT DOCUMENTS

| | | | | |
|---|---|---|---|---|
| 6,626,375 | B1 * | 9/2003 | Ireland | B64D 1/18 169/53 |
| 8,989,922 | B2 | 3/2015 | Jones et al. | |
| 9,815,078 | B2 * | 11/2017 | Neustadt | B05B 13/005 |
| 2010/0289845 | A1 * | 11/2010 | Conway | B41J 3/60 347/16 |
| 2014/0032021 | A1 * | 1/2014 | Metzler | G01S 5/0036 701/3 |
| 2014/0217230 | A1 | 8/2014 | Helou, Jr. | |
| 2014/0233099 | A1 | 8/2014 | Stark et al. | |
| 2015/0254988 | A1 * | 9/2015 | Wang | G05D 1/0214 701/3 |
| 2015/0274294 | A1 * | 10/2015 | Dahlstrom | B64D 1/18 239/722 |
| 2015/0314434 | A1 * | 11/2015 | Bevins, Jr. | B23D 59/001 30/514 |
| 2016/0260207 | A1 * | 9/2016 | Fryshman | G06T 7/0008 |
| 2017/0147907 | A1 * | 5/2017 | Fryshman | G06K 9/6267 |

(Continued)

FOREIGN PATENT DOCUMENTS

WO    WO-2015085155         6/2015
WO    WO-2015162613 A1 *    10/2015 ........... B64C 39/024

OTHER PUBLICATIONS

192 Future Uses for Flying Drones, (Web Page) <http://www.futuristspeaker.com/2014/09/192-future-uses-for-flying-drones/>.

(Continued)

*Primary Examiner* — Justin M Benedik
(74) *Attorney, Agent, or Firm* — HP Inc. Patent Department (57) ABSTRACT

An example unmanned aerial vehicle includes an electromagnetic radiation (EMR) sensor. The EMR sensor detects a signal indicative of a direction of emission of the signal. The unmanned aerial vehicle also includes a nozzle to eject the substance based on the direction of emission.

20 Claims, 6 Drawing Sheets

(56) References Cited

U.S. PATENT DOCUMENTS

2017/0190104 A1* 7/2017 Bostick .................. B33Y 10/00
2017/0209885 A1* 7/2017 Neustadt ............... B05B 13/005
2017/0259920 A1* 9/2017 Lai .......................... B64D 1/18
2017/0291439 A1* 10/2017 Koyata .................... B41J 29/38
2017/0316283 A1* 11/2017 Fryshman ............ G06K 9/6267

OTHER PUBLICATIONS

Amato, A., Projector Drone Turns Any Surface into a Video Screen, (Web Page), Jun. 16, 2014, <http://dronelife.com/2014/06/26/projector-drone-turns-surface-video-screen/>.

'Flying 3D Printer' Could Play Key Role in Emergencies, (Web Page), May 7, 2014, <http://www.bbc.com/news/technology-27311292>.

Michael, Image Analysis: Color Detection for Multiple Robots, (Web Page), Aug. 17, 2011, <http://www.ludep.com/image-analysis-color-detection-for-multiple-robots/>.

Sabre Sky3D Uav LiDAR System Testing, (Web Page), Apr. 2, 2015, <http://www.sabresurvey.com/24,news,drone-lidar-mapping.html>.

* cited by examiner

Generate a Signal Based on a Direction to Emit
402

Emit EMR Based on the Signal to Trace a Grid
404

Determine the Location of an Unmanned Aerial Vehicle Based on the Grid
406

Determine Movement or Orientation of Unmanned Aerial Vehicle
408

Interpolate the Location of the Unmanned Aerial Vehicle Based on the Movement or Orientation
410

Determine the Substance to Be Printed Based on the Location, the Movement, or a Planned Movement
412

Eject the Substance Towards the Print Target
414

SIGNALING PRINT LOCATIONS

BACKGROUND

Unmanned aerial vehicles may be able to fly without a pilot occupying the unmanned aerial vehicle. The unmanned aerial vehicle may be smaller and lighter than a manned aerial vehicle and thus consume less energy. As used herein, the term "unmanned aerial vehicle" refers to a vehicle able to achieve aerodynamic lift without applying the lift to a human occupant. For example, the unmanned aerial vehicle may be an autonomous aerial vehicle. The unmanned aerial vehicle may include a fixed wing to provide lift, a rotor to provide lift, a flapping wing to provide lift, or the like.

DETAILED DESCRIPTION

Unmanned aerial vehicles may print images on print targets, such as large surfaces. As used herein, the term "print target" refers to a material that receives an output from a printer. For example, the print target may include paper, a billboard, a wall, a print bed of a three-dimensional printer, or the like. The term "printer" refers to a system that outputs a substance at locations specified to the printer. For example, the printer may include an unmanned aerial vehicle and may output a printing liquid, toner, or the like to color the locations specified to the printer. In an example, the printer may output a substance that does not color the print target (e.g., a sealant, a coating, a melted filament, a material to be fused, etc.).

The unmanned aerial vehicles may determine their locations and print a substance based on the locations. For example, the unmanned aerial vehicles may determine their absolute positions based on a satellite navigation system. However, the positions determined based on the satellite navigation system may have limited precision. The precision may not be high enough to produce an image with a desired dot density. In an example, the unmanned aerial vehicles may determine their relative position based on the satellite navigation system, local radio triangulation, or the like. However, the unmanned aerial vehicle may need expensive hardware and a time-intensive setup, and the precision may still be insufficient for many applications.

The unmanned aerial vehicles may employ image recognition of the print target to determine the positions of the unmanned aerial vehicles, or a remote camera aimed at the unmanned aerial vehicles may use image recognition to determine the positions of the unmanned aerial vehicles. Image recognition may be computationally intensive and slow, so the printing may be slow or include errors from drifting of the unmanned aerial vehicles during computation of the positions. The unmanned aerial vehicles may also be limited to print targets without uniform surfaces when performing local image recognition. In an example, the unmanned aerial vehicles may include distance sensors to determine their position. However, the unmanned aerial vehicles may need perpendicular surfaces a uniform distance away in each orthogonal direction to determine their positions. In addition, multiple unmanned aerial vehicles may interfere with each other's position determination. Accordingly, printing by unmanned aerial vehicles may be improved with a precise and inexpensive way to determine where to print substances on a print target.

Figure 1:
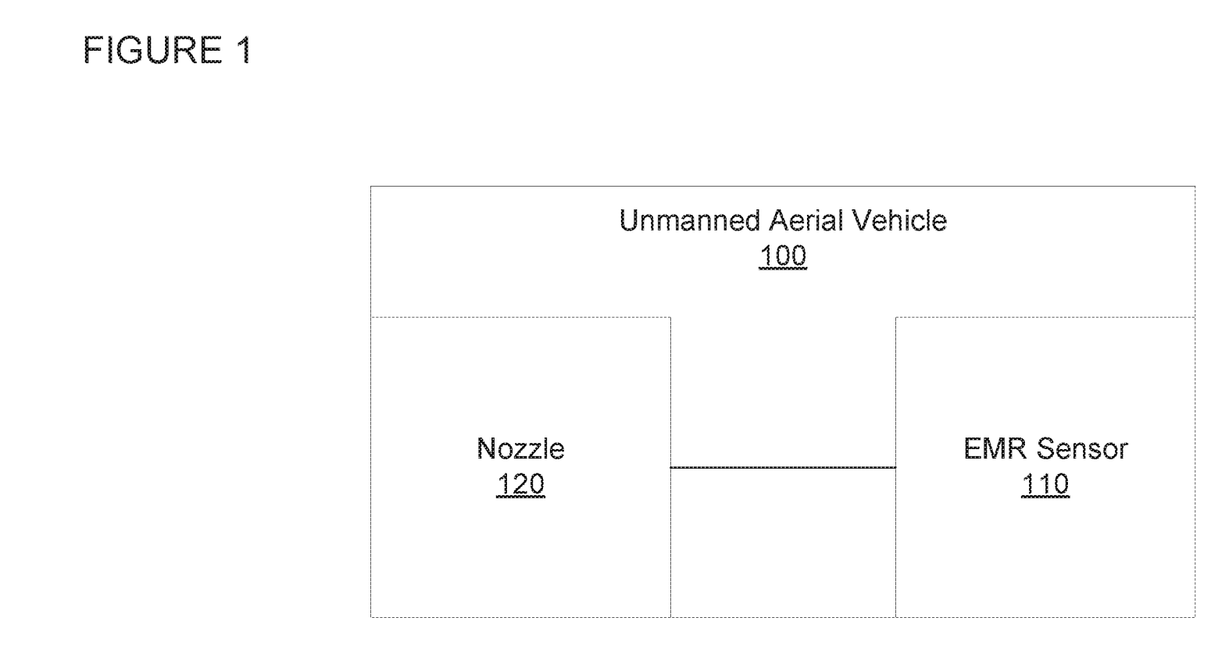
FIG. 1 is a block diagram of an example unmanned aerial vehicle to print on a print target.

FIG. 1 is a block diagram of an example unmanned aerial vehicle 100 to print on a print target. The unmanned aerial vehicle 100 may include an electromagnetic radiation (EMR) sensor 110. As used herein, the term "EMR sensor" refers to a device that measures an intensity of incident EMR. The EMR sensor 110 may include hardware (e.g., analog or digital circuitry) to demodulate an EMR signal, to generate an electrical signal indicative of the intensity of the incident EMR, or the like. The EMR sensor 110 may detect a signal indicative of a direction of emission of the signal. For example, the frequency, phase, amplitude, modulation, etc. of the EMR may indicate the direction of emission of the signal.

The unmanned aerial vehicle 100 may also include a nozzle 120 to eject the substance based on the direction of emission of the signal. For example, the content of the signal may be indicative of the direction of emission without the content of the signal being indicative of the substance to print. Rather, the substance to be printed may be determinable from the direction of emission. As used herein, the term "signal content" refers to information encoded in the signal, for example, via modulation, selection of intensity or frequency, or the like. The nozzle 120 may eject the substance at the location at which the signal is detected, or the nozzle 120 may eject the substance at an offset from the location at which the signal is detected.

Figure 2:
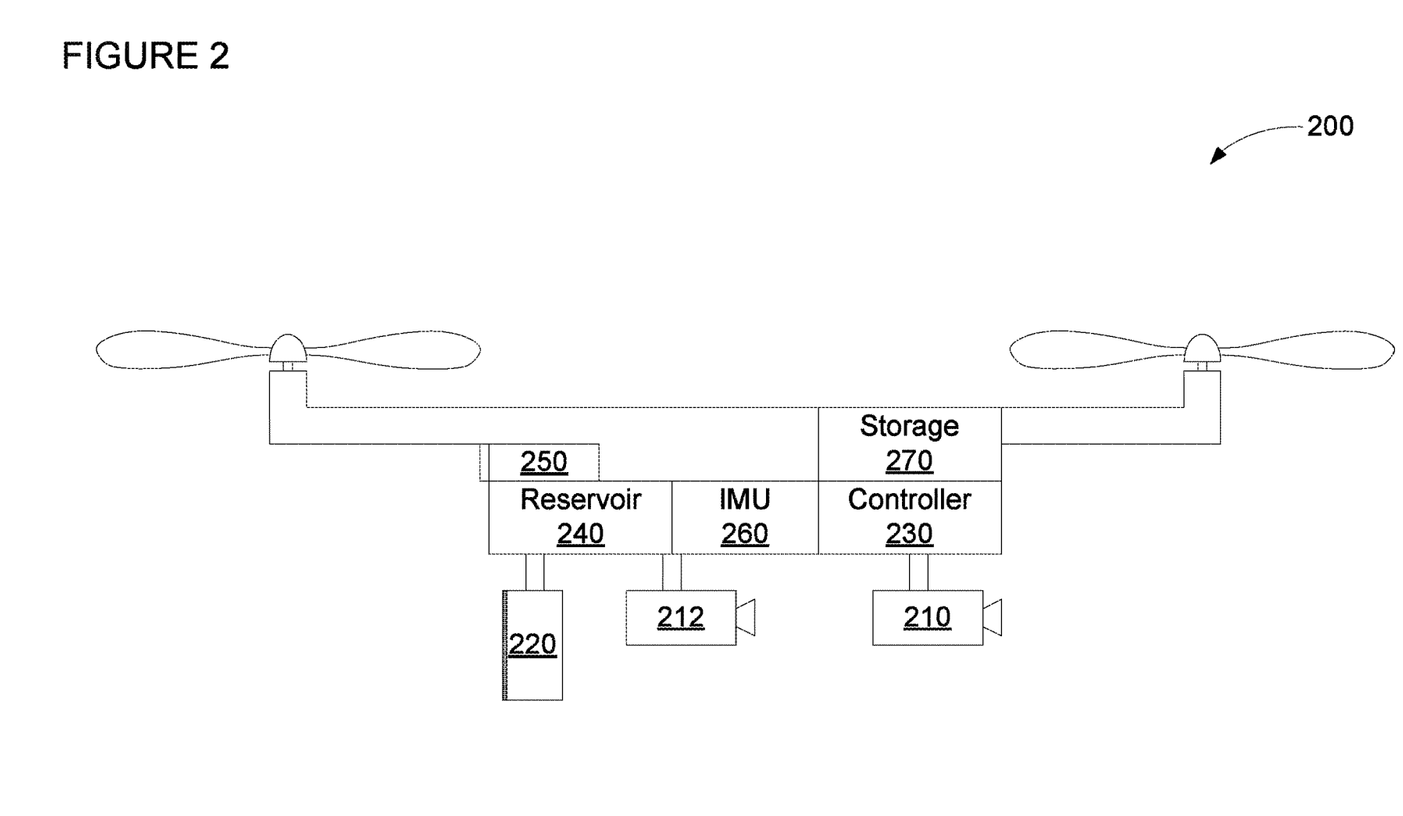
FIG. 2 is a schematic diagram of another example unmanned aerial vehicle to print on a print target.

FIG. 2 is a schematic diagram of another example unmanned aerial vehicle 200 to print on a print target. In the illustrated example, the unmanned aerial vehicle 200 may be a rotary-wing unmanned aerial vehicle. The unmanned aerial vehicle 200 may include a fixed wing, a flapping wing, or the like in other examples. The unmanned aerial vehicle 200 may include an EMR sensor 210. The EMR sensor 210 may include an antenna, an image sensor (e.g., a charge-coupled device, a complementary metal-oxide-semiconductor sensor, etc.), or the like. The EMR sensor 210 may detect EMR with a wavelength less than or no greater than a dot size on the print target. As used herein, the term "dot" refers to the smallest element of an image to be printed. The dot size on the print target may be 0.001, 0.002, 0.005, 0.01, 0.02, 0.05, 0.1, 0.2, 0.5 inches or the like. Accordingly, the EMR sensor 210 may detect microwave EMR (e.g., high frequency microwave EMR), terahertz EMR, infrared EMR, visible EMR, ultra violet EMR, X-ray EMR, or the like. In an example, the EMR sensor 210 may detect a high intensity or narrow beam laser.

The EMR sensor 210 may demodulate the signal to extract the indication of the direction of emission. The modulation of the signal may include modulation based on amplitude, frequency, phase, or the like (e.g., amplitude modulation, frequency modulation, phase modulation, amplitude shift key, on-off key, frequency shift key, phase shift key, amplitude and phase shift keying, such as quadrature amplitude modulation, etc.). The modulation may be analog or digital. In an example, an absolute amplitude, absolute frequency, absolute phase, or the like may indicate the direction of emission. The direction of emission may be selected to correspond to a location on the print target where a dot is to be printed. Accordingly, the signal may be indicative of a location of the unmanned aerial vehicles 200 relative to dots in the image to be printed. In some examples, the signal may indicate a portion of the direction of emission (e.g., a portion of the location). For example, a first signal may be indicative of a vertical direction of emission/vertical position, and a second signal may be indicative of a horizontal direction of emission/horizontal position. The first signal may be traced in a horizontal direction, and the second signal may be traced in a vertical direction. For example, an EMR emitter (not shown) may trace a plurality of horizontal or vertical scanlines, and the signal for each scanline may include modulation indicative of the vertical or horizontal position of the scanline. Indicating the vertical and horizontal separately may permit a slower modulation rate, faster scanning of the scanlines, or the like.

The signal may indicate the direction of emission with a number corresponding to a count of which scanline is being drawn (e.g., a position in a coordinate grid with a unit length corresponding to the distance between scanlines), an azimuth or elevation, a distance along the print target, or the like. In some examples, the signal may include header information, an indication of whether a horizontal or vertical position is indicated, error detection information (e.g., forward error correction, parity information, etc.), etc. In an example, the unmanned aerial vehicle 200 may include a plurality of EMR sensors and distinguish horizontal from vertical scanlines based on a path across the plurality of sensors, based on variations in indicated position between the sensors, or the like. The EMR sensor 210 may demodulate the signal, perform error detection or correction, remove header information, or the like. The EMR sensor 210 may output the direction of emission, the indicated direction of emission, or the like.

The unmanned aerial vehicle 200 may include a nozzle 220 to eject a substance. The nozzle 220 may eject the substance using pressure from a pump, a heating element, a piezoelectric element, or the like. The unmanned aerial vehicle 200 may include a reservoir 240 to store the substance. The nozzle 220 may be coupled to the reservoir 240 and receive the substance to be ejected from the reservoir 240. In some examples, the unmanned aerial vehicle 200 may include a plurality of nozzles, which may eject a single substance. In an example, the unmanned aerial vehicle 200 may include a plurality of reservoirs respectively containing a plurality of substances to be ejected by the plurality of nozzles.

The unmanned aerial vehicle 200 may include a controller 230. As used herein, the term "controller" refers to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware.

The controller may determine a location of the unmanned aerial vehicle based on the signal. For example, the controller 230 may translate the direction of emission to a location if the direction of emission is not expressed as a location, may combine indications of horizontal position and indications of vertical position to determine location, or the like. The controller 230 may determine which substance to print or whether to print the substance based on the location indicated by the signal. For example, the controller 230 may retrieve an indication of the substance from a mapping between substances to be printed and directions of emissions, locations on the print target, locations of the unmanned aerial vehicle, or the like. The mapping may be stored in a storage device 270 located in the unmanned aerial vehicle 200 or in a storage device located remotely from the unmanned aerial vehicle 200. The mapping may indicate a quantity of each substance to be ejected at each location. There may be a mapping for each substance to be printed, mappings for groups of substances (e.g., a color substance mapping, a non-color substance mapping, etc.), a single mapping for all substances to be printed, or the like. The mapping may include an image file, a lookup table, an array, or the like. The controller 230 may receive the demodulated information indicative of the direction of emission from the EMR sensor 210, and the controller 230 may determine the substance to be printed based on the demodulated information and the mapping.

The controller 230 may instruct the nozzle 220 to eject the determined substance. In some examples, the controller 230 may determine whether the unmanned aerial vehicle 200 is able to print the indicated substance. For example, the unmanned aerial vehicle 200 may be carrying one substance or fewer than all possible substances. The controller 230 may instruct the nozzle 220 to eject a first substance stored in the reservoir 240 based on determining the location corresponds to the first substance and instruct the nozzle 220 not to eject based on determining the location corresponds to a second substance not stored in the reservoir 240. A single location may correspond to the first and second substances. In an example, the unmanned aerial vehicle 200 may be carrying several substances, and the controller 230 may determine which substance to print.

To print the substance accurately to the correct location, the controller 230 may cause the unmanned aerial vehicle 200 to maintain a fixed distance from the print target. The unmanned aerial vehicle 200 may include a distance sensor 250 to measure the distance to the print target. The distance sensor 250 may include an active or passive EMR sensor, an ultrasonic sensor, a capacitive sensor, or the like to measure the distance. The distance sensor 250 may indicate to the controller 230 the distance to the print target. The controller 230 may navigate the unmanned aerial vehicle 200 based on the indicated distance. For example, if wind causes the unmanned aerial vehicle 200 to deviate from the fixed distance, the controller 230 may navigate the unmanned aerial vehicle 200 to correct for the deviation.

To print the substance accurately arrive at the intended location, the controller 230 may also cause the unmanned aerial vehicle 200 to maintain a constant velocity and constant orientation during printing. The unmanned aerial vehicle 200 may include an accelerometer, a gyroscope, or the like to determine movement, orientation (e.g., pitch, yaw, roll), etc. of the unmanned aerial vehicle 200. In the illustrated example, the unmanned aerial vehicle 200 may include an inertial measurement unit (IMU) 260 that includes an accelerometer and a gyroscope. The IMU 260 may indicate the acceleration, orientation, etc. of the unmanned aerial vehicle 200 to the controller 230. The controller 230 may determine the velocity of the unmanned aerial vehicle based on the acceleration. In an example, the controller 230 may determine the velocity or orientation based on changes in the location detected by the EMR sensor 210. In some examples, the unmanned aerial vehicle 200 may include a plurality of EMR sensors (e.g., a first EMR sensor 210 and a second EMR sensor 212) to each detect a signal indicative of a respective direction of emission, and the controller 230 may determine the orientation based on the relative locations measured by the plurality of EMR sensors. The controller 230 may determine the velocity or orientation based on measurements from only the IMU 260, only the EMR sensor 210, both the IMU 260 and the EMR sensor 210, or the like. The controller 230 may navigate the unmanned aerial vehicle 200 to maintain the constant velocity or constant orientation, which may include correcting deviations therefrom.

The controller 230 may determine when to eject the substance from the nozzle 220 based on measurements from the IMU 260 (e.g., movement detected by the accelerometer, an orientation determined by the gyroscope, etc.), the location determined from the signal detected by the EMR sensor 210, or the like. The unmanned aerial vehicle 200 may be in motion during printing or oriented such that a line of nozzles are not aligned with dot edges, so the controller 230 may determine when to eject the substance so that the substance is delivered to the correct location on the print target. If the controller 230 maintains a constant velocity or constant orientation, the controller 230 may compute the ejection timing in advance based on the constant velocity or constant orientation. In an example, the controller 230 may compute the ejection timing dynamically based on variations from the constant velocity or constant orientation, movement at a non-constant velocity or non-constant orientation (e.g., movement along a non-linear or pseudorandom path, etc.), or the like. Before, during, or after printing a current dot, the controller 230 may determine which dot to print next by determining the neighboring dot in the direction of movement in the mapping. Accordingly, the controller 230 may instruct the nozzle 220 to eject the substance for the neighboring dot as soon as the nozzle 220 is in position to begin printing the neighboring dot.

The EMR sensor 210 may be separated from the print target. Accordingly, the location on the print target at which the nozzle 220 will deliver the substance may be different from the location on the print target at which the signal may arrive if not intercepted by the EMR sensor 210. The controller 230 may correct for the offset between the signal destination and the nozzle print destination. In an example, the signal emitter (not shown) may adjust the direction in which the signal is transmitted to correct for the offset. If the controller 230 maintains a fixed distance from the print target, the controller 230 or the signal emitter may correct for the offset based on the fixed distance, based on a distance between the nozzle 220 and the EMR sensor 210, or the like. In some examples, the EMR sensor 210 or the nozzle 220 may be positioned to minimize the offset.

The controller 230 may use any of various strategies to determine where to navigate the unmanned aerial vehicle 210 and eject substance on the print target. In some examples, the controller 230 may not coordinate with other unmanned aerial vehicles (not shown) other than to avoid collisions. In an example, the controller 230 may coordinate with other unmanned aerial vehicles or a central authority to determine where to print. The controller 230 may navigate according to a fuzzy grid pattern in which the controller 230 may navigate the unmanned aerial vehicle 200 approximately perpendicular (e.g., perpendicular to an extent achievable by the controller 230 when navigating the unmanned aerial vehicle), or perpendicular, to an edge of the print target. For example, the controller 230 may navigate the unmanned aerial vehicle 200 laterally side-to-side across the print target until the entire surface has been printed. In an example, the controller 230 may navigate the unmanned aerial vehicle 200 in a pseudorandom pattern, which may include printing pseudorandom swaths until the entire surface has been printed.

Figure 3:
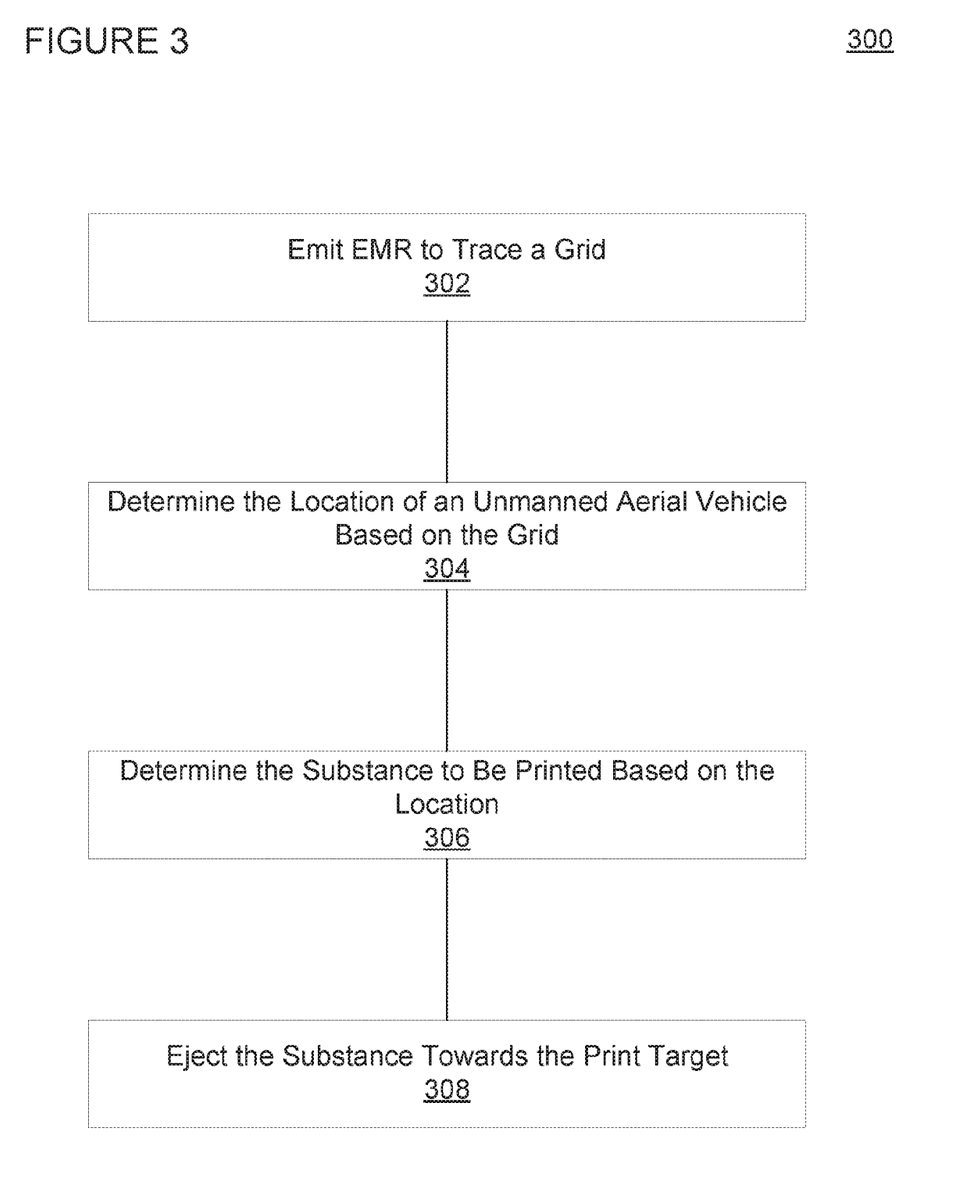
FIG. 3 is a flow diagram of an example method to print on a print target using an unmanned aerial vehicle.

FIG. 3 is a flow diagram of an example method 300 to print on a print target using an unmanned aerial vehicle. A processor may perform the method 300. At block 302, the method 300 may include emitting EMR to trace a grid on a print target. Emitting the EMR may include emitting EMR indicative of a location on the grid being traced. For example, the EMR may be indicative of which line in the grid is being traced. The EMR may be modulated, or the absolute frequency, phase, amplitude, etc. may be varied to indicate which line is being traced.

Block 304 may include determining the location of the unmanned aerial vehicle based on the grid. The unmanned aerial vehicle may determine the location of the unmanned aerial vehicle. Determining the location of the unmanned aerial vehicle may include detecting the EMR at the location of the unmanned aerial vehicle. The location may be determined based on the location on the grid indicated by the detected EMR. For example, the EMR may include a modulated indication of the location, or the EMR may include information from which the location can be calculated.

Block 306 may include determining the substance to be printed based on the location. The unmanned aerial vehicle may determine the substance to be printed. The substances to be printed at each location may have been determined in advance. Accordingly, determining the substance may include accessing the advanced determination to determine which substances are to be printed at the determined location. At block 308, the method 300 may include ejecting the substance towards the print target. Ejecting the substance may include ejecting the substance at the determined location, at an offset from the determined location, or the like. Ejecting the substance may include ejecting the substance using the unmanned aerial vehicle. In an example, the EMR emitter 510 of FIG. 5 may emit the EMR, the EMR sensor 210 or the controller 230 of FIG. 2 may determine the location or determine the substance, and the nozzle 220 of may eject the substance.

Figure 4:
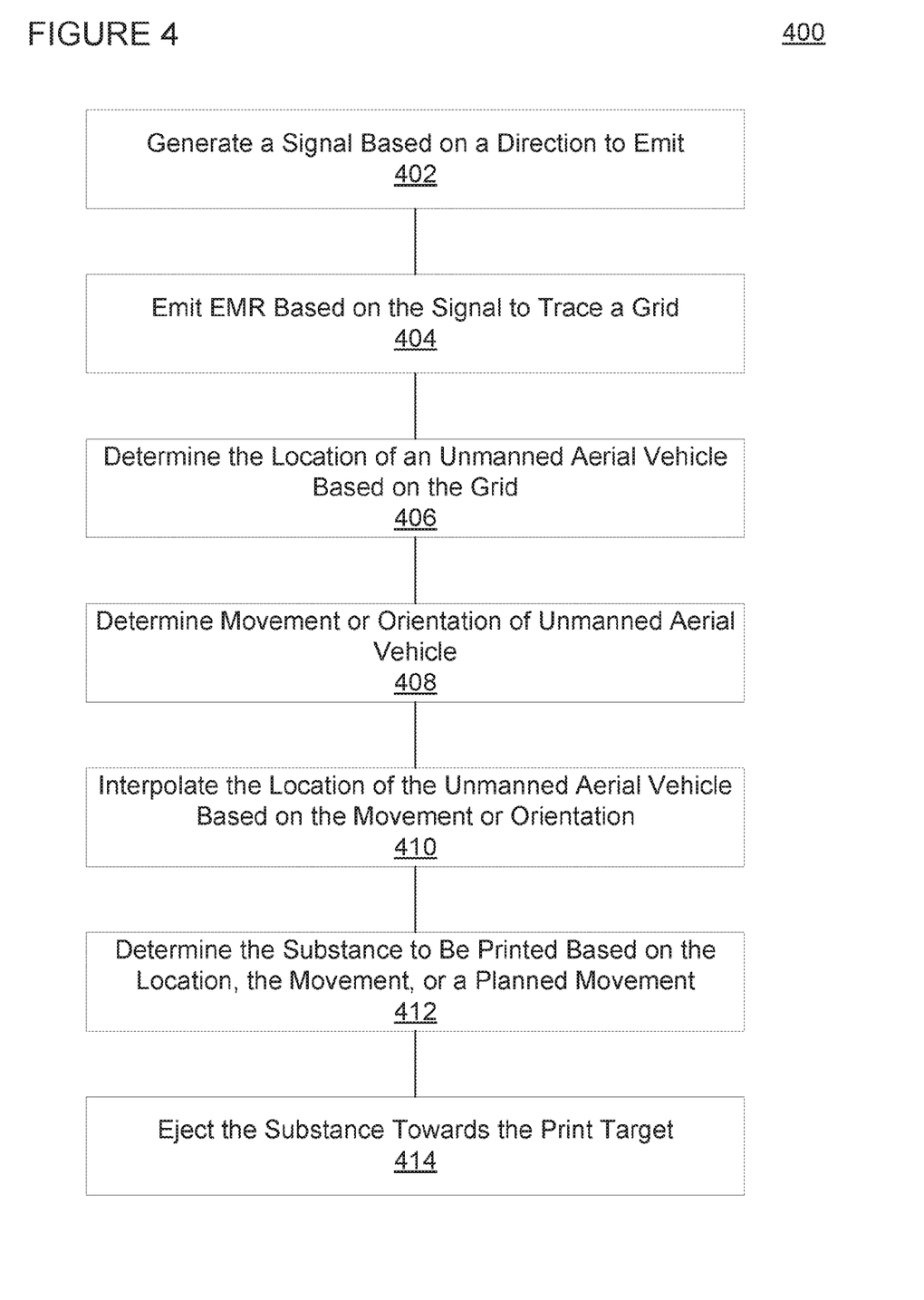
FIG. 4 is a flow diagram of another example method to print on a print target using an unmanned aerial vehicle.

FIG. 4 is a flow diagram of another example method 400 to print on a print target using an unmanned aerial vehicle. A processor may perform the method 400. At block 402, the method 400 may include generating a signal based on a direction to emit. For example, the signal may be generated to include an indication of the direction that EMR will be admitted (e.g., an indication of horizontal direction of emission, an indication of horizontal direction of emission, etc.). Block 404 may include emitting EMR based on the signal. A grid may be traced with the emitted EMR. The emitted EMR may be modulated based on the signal. Generating the signal or emitting the EMR may include modulating the EMR to include error detection information.

EMR may arrive at the unmanned aerial vehicle at a different location than it arrives at the print target. Thus, aiming the EMR based on the print target may result in the unmanned aerial vehicle printing at an incorrect location. Accordingly, the direction of emission of the EMR may be corrected to compensate for the location of the unmanned aerial vehicle relative to the print target. For example, an offset may be added to the direction of emission, grid spacing may be adjusted, line numbering may be adjusted, or the like. In some examples, the ejection of the substance may include a correction to compensate for the location of the unmanned aerial vehicle relative to the print target. In an example, the unmanned aerial vehicle may correct for the difference when detecting the EMR.

Tracing the grid may include tracing a plurality of horizontal lines, tracing a plurality of vertical lines, or the like. For example, the image may comprise a plurality of dots corresponding to substances to be ejected onto the print target. The direction of emission, grid lines, or the like may correspond to the locations of dots in the image. In an example, a distinct signal may be used for each line of the grid that is traced. For example, each line may include a line number, and the signal may indicate the line number. Accordingly, the emitted EMR may be modulated to numerically identify each line of the grid. Tracing the grid may include tracing portions of at least two distinct lines simultaneously. For example, a first EMR emitter may trace the horizontal lines while a second EMR emitter traces the vertical lines. In an example, a plurality of EMR emitters may trace both the horizontal and vertical lines. The tracing of the plurality of EMR emitters may be equidistant in time from each other. In an example, the emitted EMR may be a high intensity laser, a narrow beam laser, or the like.

At block 406, the method 400 may include determining the location of the unmanned aerial vehicle based on the grid. For example, the unmanned aerial vehicle may receive the emitted EMR and determine the location indicated by the EMR. The location may be determined by demodulating the emitter EMR and extracting an indication of the location. In an example, determining the location may include determining a first coordinate of the location from first EMR and a second coordinate of the location from second EMR. Determining the location of the unmanned aerial vehicle may include calculating the location of a nozzle, of the unmanned aerial vehicle, or the like based on the relative positions of the nozzle and the location of detection of the EMR. The unmanned aerial vehicle may detect the emitted EMR when it arrives at the location or as it approaches the location.

Block 408 may include determining movement or orientation of the unmanned aerial vehicle. For example, the movement may include velocity, acceleration, jerk, snap, or the like. The orientation may include a pitch, yaw, roll, or the like. Determining the movement or orientation may include determining the movement or orientation based on the emitted EMR (e.g., using a plurality of EMR sensors), based on a sensor on the unmanned aerial vehicle, based on a remote sensor, or the like. In an example, determining the movement may include summing or integrating acceleration measurements. In some examples, the unmanned aerial vehicle may be navigated to maintain a particular movement or orientation. For example, the unmanned aerial vehicle may navigate based on a fuzzy grid pattern, pseudorandom movements, or the like. Determining the movement or orientation may include determining the particular movement or orientation being maintained; comparing EMR, movement, or orientation measurements to intended movements or orientations; or the like. In an example, block 408 may be omitted if a particular movement or orientation is being maintained.

Block 410 may include interpolating the location of the unmanned aerial vehicle based on the movement or orientation. Interpolating the location may include calculating the interpolated location based on the determined location and the movement or orientation. Interpolating the location of the unmanned aerial vehicle may include calculating a location of the nozzle. In some examples, the location may be interpolated between detections of emitted EMR. Accordingly, the unmanned aerial vehicle may move at high speed without delaying to receive additional EMR indicative of location. Interpolating may also, or instead, allow the trace speed or modulation rate of the emitted EMR to be slower than it may be otherwise.

At block 412, the method 400 may include determining the substance to be printed based on the determined location, the interpolated location, based on current movement (e.g., a current travel direction, current velocity, etc.), based on planned movement (e.g., a planned travel direction, planned velocity, planned course adjustment, etc.), or the like. For example, determining the substance may include determining a substance to be printed at a location to which the unmanned aerial vehicle will move. In an example, determining the substance may include determining the next dot in the image that will correspond to the location of the unmanned aerial vehicle and looking up the substance for the next dot. The substance for the next dot, a dot after the next dot, etc. may be determined while the current dot is being printed. Accordingly, the unmanned aerial vehicle may move at high speed without delaying to determine the substance. Determining the substance may include determining a quantity of substance to be printed.

At block 414, the method 400 may include ejecting the substance towards a print target. For example, the substance may be ejected at the location at which the EMR is detected, at an offset from the location at which the EMR is detected, or the like. Timing of ejection may be based on movement of the unmanned aerial vehicle. For example, the movement of the unmanned aerial vehicle may impart momentum to the ejected substance, which may cause the substance to arrive at the print target at a location different than the one from which it is ejected. Accordingly, ejecting the substance may include ejecting the substance at a location that causes it to arrive at the correct destination. The orientation may affect the location of substance ejection relative to the location of EMR detection or may affect the relative locations of ejections from a plurality of locations on the unmanned aerial vehicle. Timing of ejection may be adjusted to compensate from effects of the orientation. In an example, the modulation engine 620 of FIG. 6 may perform block 402; the EMR emitter 610 may perform block 404; the EMR sensor 210 or controller 230 of FIG. 2 may perform block 406; the IMU 260 or controller 230 may perform block 408; the controller 230 may perform blocks 410 and 412; and the nozzle 220 may perform block 414.

Figure 5:
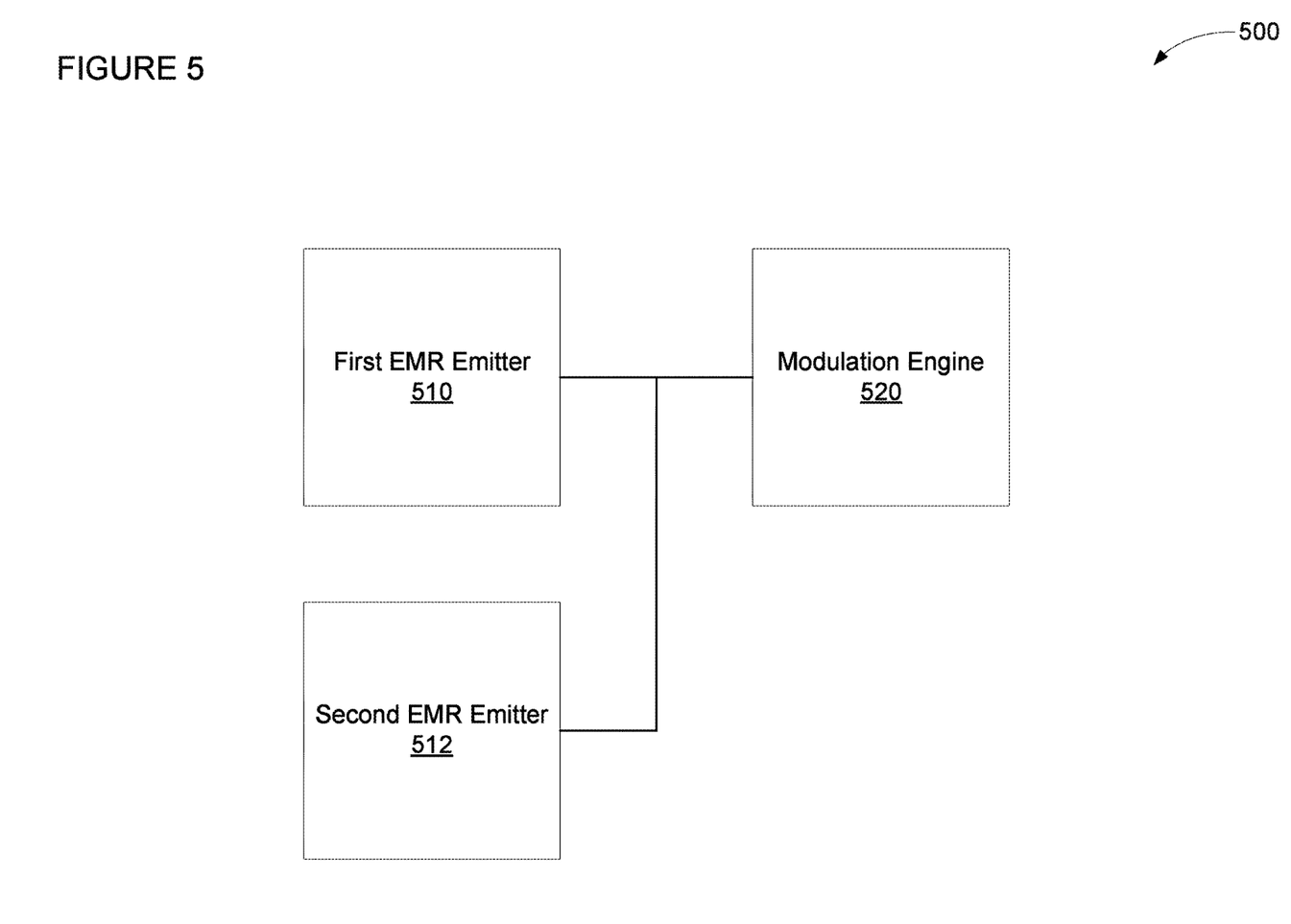
FIG. 5 is a block diagram of an example system to transmit location information to an unmanned aerial vehicle.

FIG. 5 is a block diagram of an example system 500 to transmit location information to an unmanned aerial vehicle. The system 500 may include first and second EMR emitters 510, 512. As used herein, the term "EMR emitter" refers to a device that produces EMR. The EMR emitters 510, 512 may include hardware (e.g., analog or digital circuitry, etc.) to generate the EMR, to modify characteristics of the EMR, to modulate an EMR signal, to direct the EMR, or the like. The first EMR emitter 510 may emit first EMR and trace a first path with the first EMR. The second EMR emitter 512 may emit second EMR and trace a second path with the second EMR. The first path may include horizontal lines, and the second path may include vertical lines. In some examples, the first and second path may be intersecting or orthogonal without being horizontal or vertical. In an example, the first and second path may be parallel.

The system 500 may also include a modulation engine 520. As used herein, the term "engine" refers to hardware (e.g., a processor, such as an integrated circuit or other circuitry, an optical component, such as a lens or mirror, etc.) or a combination of software (e.g., programming such as machine- or processor-executable instructions, commands, or code such as firmware, a device driver, programming, object code, etc.) and hardware. Hardware includes a hardware element with no software elements such as an ASIC, an FPGA, etc. A combination of hardware and software includes software hosted at hardware (e.g., a software module that is stored at a processor-readable memory such as RAM, a hard disk or solid-state drive, resistive memory, or optical media such as a digital versatile disc DVD, and/or executed or interpreted by a processor), or hardware and software hosted at hardware. The modulation engine 520 may modulate the first EMR to indicate a position of the first path and modulate the second EMR to indicate the second EMR to indicate a position of the second path. The modulation engine 520 may modulate the EMR by modulating signals to the first and second EMR emitters 510, 512, by modulating the EMR before leaving the first and second EMR emitters 510, 512, or the like. In some examples, the modulation engine 520 may include first and second modulators for the first and second EMR emitters 510, 512.

Figure 6:
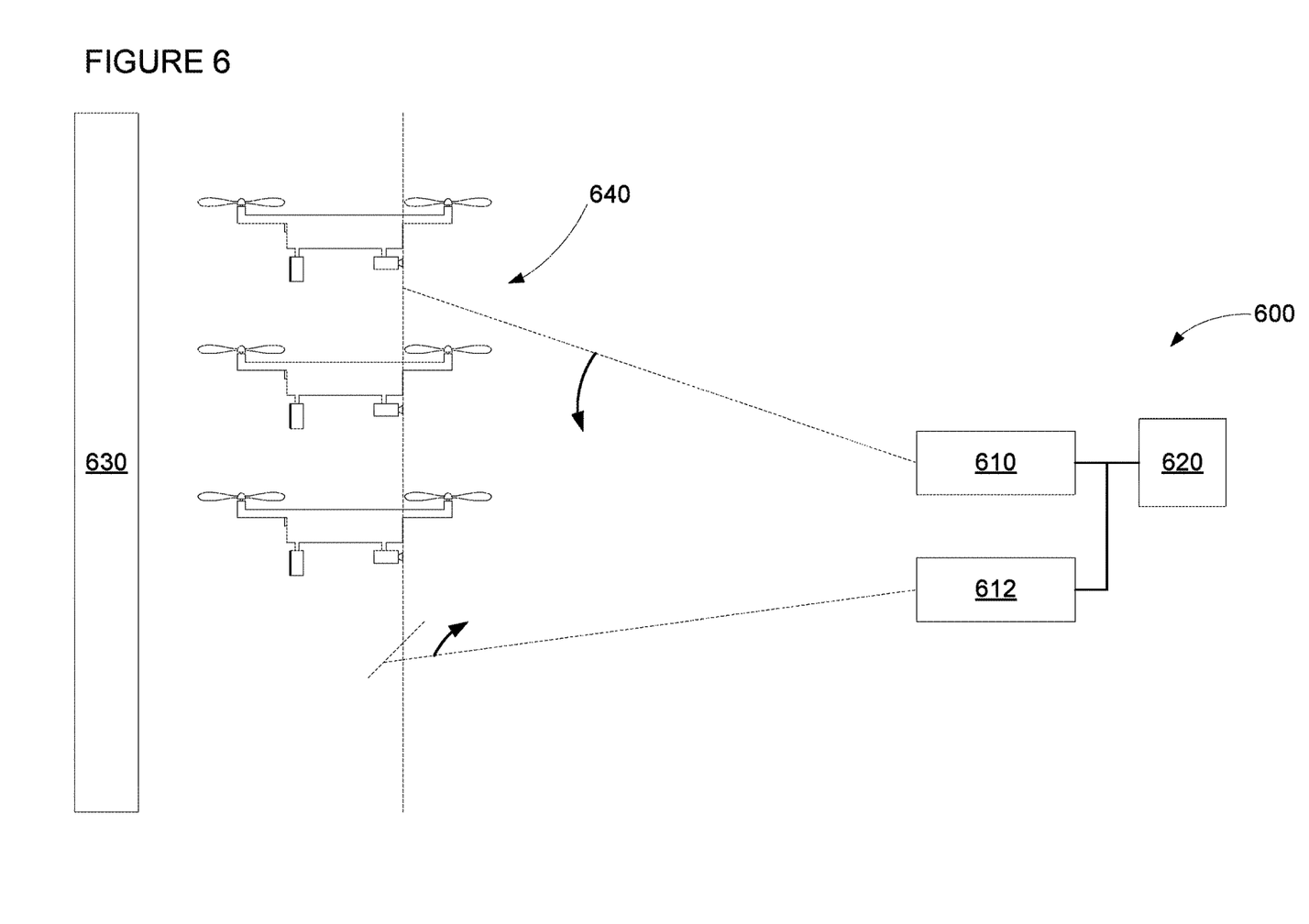
FIG. 6 is a schematic diagram of another example system to transmit location information to an unmanned aerial vehicle.

FIG. 6 is a schematic diagram of another example system 600 to transmit location information to an unmanned aerial vehicle. The system 600 may include first and second EMR emitters 610, 612. In the illustrated example, the first and second EMR emitters 610, 612 may include high intensity, narrow-beam lasers. The first EMR emitter 610 may trace a vertical path with a first laser beam, and the second EMR emitter 612 may trace a horizontal path with a second laser beam. The first and second EMR emitters 610, 612 may trace a plurality of vertical and horizontal paths to form a grid. The points in the grid where the horizontal and vertical paths intersect may correspond to dots on a print target 630. In an example, the intersections may have a higher resolution than the dots to more precisely determine where to print each dot.

In some examples, the first and second EMR emitters 610, 612 may trace paths that produce a grid at a predetermined offset from the locations of dots on the print target 630. Thus, the EMR emitters 610, 612 may not form a grid on the print target 630 with the intersections at the locations where the dots are to be printed. Rather, the EMR emitters 610, 612 may produce a grid that may be aligned with the dots if the print target 630 were moved by a particular offset. The particular offset may be in a direction normal to the surface of the print target 630. The particular offset may be selected based on the distance of unmanned aerial vehicle image sensors from the surface of the print target 630 when the unmanned aerial vehicles 640 are printing. For example, the particular offset may be determined based on a predetermined distance between the unmanned aerial vehicles 640 and the print target 630 and based on the positions of the image sensors on the unmanned aerial vehicles 640.

In some examples, the system 600 may include a first plurality of EMR emitters to emit EMR and trace the first path and a second plurality of EMR emitters to emit EMR and trace the second path. The first plurality of EMR emitters may include the first EMR emitter 610, and the second plurality of EMR emitters may include the second EMR emitter 612. In an example, the first plurality of EMR emitters may trace vertical lines, and the second plurality of EMR emitters may trace horizontal lines. The EMR emitters in each plurality may trace the same lines as other EMR emitters but the lines being traced at any point in time may be spatially offset from each other by predetermined distances. For example, each EMR emitter may repeatedly trace every horizontal or vertical line in a predetermined pattern, and the spatial offset between EMR emitters may be selected to minimize the time between the unmanned aerial vehicles 640 receiving the EMR emissions. The predetermined pattern may include tracing the next closest parallel line and starting over when an end is reached, skipping a predetermined number of closest parallel lines to trace the next line, a pseudorandom pattern, or the like. In an example, each emitter in the first and second pluralities may trace every horizontal and every vertical line, or each emitter may trace a predetermined set of lines that does not overlap with any other emitter.

The system 600 may include a modulation engine 620 to modulate the first EMR and the second EMR. The modulation engine 620 may modulate the first and EMR with direct modulation (e.g., controlling current to the EMR emitters 610, 612, etc.), optical modulation using an optical modulator (e.g., an electro-optic modulator, acousto-optic modulator, magneto-optic modulator, mechano-optical modulator, etc.), modification of a position or orientation of a mirror or lens, or the like. The modulation engine 620 may modulate the first EMR to indicate a position of the first path and modulate the second EMR to indicate a position of the second path. The modulation engine 620 may adjust a phase, a frequency, an amplitude or intensity, or the like of the first and second EMR.

The modulation engine 620 may modulate the first EMR to include an indication that the first EMR corresponds to the first path and the second EMR to include an indication that the second EMR corresponds to the second path. For example, the unmanned aerial vehicles 640 may be unable to distinguish the first EMR from the second EMR. In an example, the first and second EMR may include distinct training or header sections; the first and second EMR may be multiplexed based on frequency-division multiplexing, time-division multiplexing, code-division multiplexing, etc.; the unmanned aerial vehicle 640 may include sensors able to determine the path being traced by the EMR, or the like. The first EMR emitter 610 may trace a vertical line, and the modulation engine 620 may modulate the first EMR to indicate a horizontal position of the vertical line. Similarly, the second EMR emitter 612 may trace a horizontal line, and the modulation engine 620 may modulate the second EMR to indicate a vertical position of the horizontal line. For example, the modulation engine 620 may indicate the line positions based on distance, based on a sequential numbering system for the lines, based on a sequential numbering system relating the lines to corresponding dot positions, or the like.

In some examples, the system 600 may include a plurality of unmanned aerial vehicles 640. The unmanned aerial vehicles 640 may print on the print target based on the first and second EMR without coordinating with others of the plurality of unmanned aerial vehicles. The unmanned aerial vehicles 640 may navigate according to a fuzzy grid pattern, a pseudorandom pattern, or the like. The unmanned aerial vehicles 640 may detect each other and avoid collisions during navigation. The unmanned aerial vehicles 640 carry a single substance, a plurality of substances, the same substances as one another, different substances from one another, or the like. The unmanned aerial vehicles 640 may carry color substances, non-color substances (e.g., a sealant, a coating, a melted filament, a material to be fused, etc.), or the like. The unmanned aerial vehicles 640 may store a mapping between a location and a quantity of substance to print at that location, or the unmanned aerial vehicles 640 may be communicatively coupled to a remote storage device storing the mapping. Based on the location of the EMR emitter 610, there may be some distortion in the location of the intersection points between the horizontal and vertical lines. The unmanned aerial vehicles 640 may correct for the distortion to the location based on a location of the EMR emitter 610 relative to the print target 630, a location of the unmanned aerial vehicles 640 relative to the print target 630, or the like.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:

1. An unmanned aerial vehicle, comprising:
    an electromagnetic radiation (EMR) sensor to detect a signal indicative of a direction of emission of the signal, the detected signal corresponding to a grid on a printed target;
    a controller to determine a location of the unmanned aerial vehicle based on the grid; and
    a nozzle to eject a substance based on the direction of emission and the location.

2. The unmanned aerial vehicle of claim 1, further comprising a distance sensor to measure a distance to a print target; and wherein the controller is to enable maintaining a fixed distance from the print target.

3. The unmanned aerial vehicle of claim 1, wherein the EMR sensor is to detect a first signal indicative of a vertical direction of emission of the first signal and a second signal indicative of a horizontal direction of emission of the second signal.

4. The unmanned aerial vehicle of claim 1, further comprising a second EMR sensor to detect a second signal indicative of a direction of emission of the second signal; and a controller to determine an orientation of the unmanned aerial vehicle based on the signal and the second signal.

5. The unmanned aerial vehicle of claim 1, further wherein the controller is to retrieve an indication of the substance from a storage device based on the location.

6. The unmanned aerial vehicle of claim 1, wherein further comprising an accelerometer to detect movement of the unmanned aerial vehicle, wherein the controller is to determine when to eject the substance from the nozzle based on measurements by the accelerometer and the location.

7. A method, comprising:
    emitting electromagnetic radiation (EMR) to trace a grid on a print target;
    determining, using an unmanned aerial vehicle, a location of the unmanned aerial vehicle based on the grid;
    determining, using the unmanned aerial vehicle, a substance to be printed based on the location; and
    ejecting the substance towards a print target.

8. The method of claim 7, further comprising interpolating the location of the unmanned aerial vehicle based on the determined location and a measurement of at least one of movement and orientation on the unmanned aerial vehicle.

9. The method of claim 7, wherein determining the substance to be printed comprises determining the substance based on the location and at least one of a current travel direction and a planned travel direction.

10. The method of claim 7, wherein emitting the EMR to trace the grid comprises modulating the EMR to numerically identify each line in the grid.

11. The method of claim 10, wherein modulating the EMR includes modulating the EMR to include error detection information.

12. The method of claim 7, wherein emitting the EMR comprises tracing a plurality of horizontal lines with EMR indicative of vertical position and tracing a plurality of vertical lines with EMR indicative of horizontal position.

13. The method of claim 12, wherein tracing the plurality of horizontal and vertical lines comprises tracing portions of at least two distinct lines simultaneously.

14. A system, comprising:
    a first electromagnetic radiation (EMR) emitter to emit first EMR and trace a first path with the first EMR;
    a second EMR emitter to emit second EMR along a second path and trace a second path with the second EMR; and
    a modulation engine to modulate the first EMR to indicate a position of the first path and modulate the second EMR to indicate a position of the second path.

15. The system of claim 14, wherein the modulation engine is to modulate the first EMR to include an indication that the first EMR corresponds to the first path.

16. The system of claim 14, wherein the first and second EMR emitters comprise lasers, and wherein the modulation engine comprises an optical modulator to adjust at least one of a phase, a frequency, and an intensity of the first and second EMR.

17. The system of claim 14, wherein the EMR emitter is to emit the first and second EMR at predetermined offsets based on a predetermined distance between a print vehicle and a print target.

18. The system of claim 14, wherein the first path is a vertical line on the print target and the modulation engine is to modulate the first EMR to indicate a horizontal position of the vertical line, and wherein the second path is a horizontal line on the print target and the modulation engine is to modulate the second EMR to indicate a vertical position of the horizontal line.

19. The system of claim 14, further comprising a first plurality of EMR emitters to emit EMR and trace the first path; and a second plurality of EMR emitters to emit EMR and trace the second path, wherein the first plurality of EMR emitters includes the first EMR emitter, and wherein the second plurality of EMR emitters includes the second EMR emitter.

20. The system of claim 19, wherein the first plurality of EMR emitters trace the first path at locations offset by predetermined distances.

* * * * *

UNITED STATES PATENT AND TRADEMARK OFFICE
CERTIFICATE OF CORRECTION

PATENT NO. : 10,112,714 B2  
APPLICATION NO. : 15/138725  
DATED : October 30, 2018  
INVENTOR(S) : William E. Hertling et al.

Page 1 of 1

It is certified that error appears in the above-identified patent and that said Letters Patent is hereby corrected as shown below:

On the Title Page

In Column 1, item (72), Inventors, Line 2, delete "Benjamin White" and insert -- Benjiman White --, therefor.

Signed and Sealed this  
Thirty-first Day of December, 2019

Andrei Iancu  
*Director of the United States Patent and Trademark Office*